No. 761,397. PATENTED MAY 31, 1904.
F. PFLUGER & E. CHRISTENSEN.
BUNG HOLE BORER.
APPLICATION FILED JUNE 17, 1903.
NO MODEL.
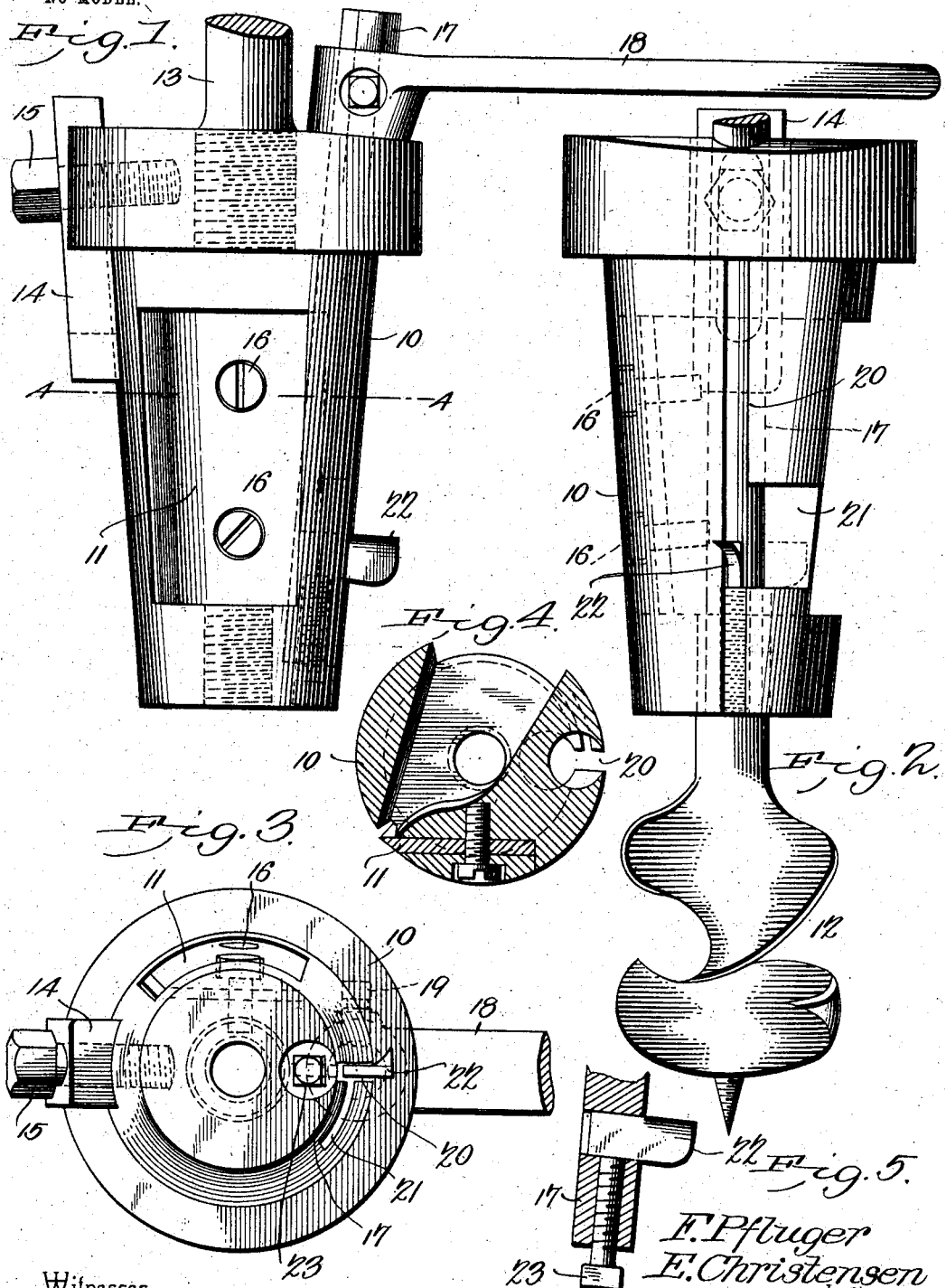
Witnesses
E. F. Stewart
C. H. Woodward
F. Pfluger
E. Christensen
Inventors
by C. A. Snow & Co
Attorneys No. 761,397. Patented May 31, 1904.

UNITED STATES PATENT OFFICE.

FRANK PFLUGER AND EMIL CHRISTENSEN, OF PORTLAND, OREGON.

BUNG-HOLE BORER.

SPECIFICATION forming part of Letters Patent No. 761,397, dated May 31, 1904.

Application filed June 17, 1903. Serial No. 161,949. (No model.)

*To all whom it may concern:*

Be it known that we, FRANK PFLUGER and EMIL CHRISTENSEN, citizens of the United States, residing at Portland, in the county of Multnomah and State of Oregon, have invented a new and useful Bung-Hole Borer, of which the following is a specification.

This invention relates to devices employed for boring, reaming, and trimming bung-holes in barrels, and has for its object to simplify and improve devices of this character and produce a device by which the bung-hole may be bored, reamed, and "trimmed" to any required extent with a single device and without removing or detaching it from the barrel or the operating-machine.

The invention consists in certain novel features of construction, as hereinafter shown and described, and specified in the claims.

In the drawings illustrative of the invention, in which corresponding parts are denoted by like designating characters, Figure 1 is a front elevation. Fig. 2 is a side elevation, and Fig. 3 is a bottom plan view, of the device. Fig. 4 is a transverse section on the line 4 4 of Fig. 1. Fig. 5 is a sectional detail of the supplemental cutter and its supporting-shaft.

The improvement which is the subject of the present application may be applied to any of the various bores and reamers in common use for forming bung-holes in barrels, or it may be applied to an implement of this character constructed especially for it, and I do not, therefore, wish to be limited in the use of the improved device to any specific form of boring or reaming implement, but reserve the right to its use in connection with any implements of this character to which it is applicable.

For the purpose of illustration the improvement is shown applied to an approved form of borer and reamer comprising a stock 10, preferably tapered and with a correspondingly-tapered "cutting-bit" 11 and a boring-point 12. The stock may be operated by hand-power or machinery, as preferred, connected to a stem (indicated at 13) at the larger end of the stock; but as the operating means forms no part of the present invention it is not illustrated.

The stock 10 is provided with a slotted depth-gage 14, controlled by a set-screw 15 to regulate the distance which the cutter will enter the stave.

The cutter 11 is controlled and supported by clamp-screws 16, operating through slots in the cutter in the usual manner.

Formed longitudinally of the stock 10 is an aperture in which a shaft 17 is disposed and provided with an operating-handle 18, connected adjustably to the shaft by a set-screw 19, so that the shaft may not only be oscillated in the stock, but likewise adjusted longitudinally thereof, as will be obvious.

Formed in the side of the stock 10 opposite the aperture for the shaft 17 and intersecting it is a longitudinal recess 26, enlarged, as at 21, at its lower end.

Formed through the shaft 17 is a transverse aperture in which a supplemental cutting-blade 22 is supported by a set-screw 23, operating through the bottom end of the shaft 17, as shown in Fig. 5.

The cutter 22 protrudes through the apertures 20 21, as shown, and is operative transversely to the cutter 11 and may be adjusted longitudinally of the stock to any required extent.

When not required, the supplemental cutter may be turned into the enlargement 21 by simply rotating the shaft 17 when the cutter is opposite the enlargement.

In operating the device the supplemental cutter will first be withdrawn into the marginal recess 21, as above described, and the bung-hole bored by the auger 12 and "reamed" to the required size by the cutter 11, the gage 14 having been "set" to the required point. This will form the bung-hole proper, but will not effect any change in the thickness of the stave. The supplemental cutter 22 is then protruded and adjusted to the proper point by the movable handle member 18 and its set-screw 19, and the continued rotation of the stock will cause the cutter 22 to remove the surplus thickness of the stave adjacent to the bung-hole and "gage" the thickness of the stave to any required degree, as will be obvious. It will also be obvious that by varying the form and size of the cutter 22 any form or configuration may be imparted to the stave adjacent to the bung-hole to adapt it to receive any of the various forms of bung linings or "bushings." By this simple means the bung-hole may be bored, reamed, and trimmed, or formed in any required shape with the one single implement and without removing it from the barrel until the whole process is completed and the bung-hole ready to receive its bushing or lining.

The implement is very simple in construction, easily operated, and may be manufactured in any required size and of any required material.

The supplemental cutter 22 may be employed simply to trim the inner face of the stave and remove the slivers caused by the boring and cutting portions of the implement when the form of bung lining or bushing employed does not require the staves to be dressed to any specific thickness or for any specific size or form of shoulder to be formed thereon.

Having thus described the invention, what we claim is—

1. The combination with a borer or reamer stock, of a shaft mounted longitudinally in said stock and carrying a supplemental cutter having its cutter edge operating transversely of the reamer-cutter and independently thereof and projecting through the periphery of the stock, said cutter-carrying shaft being longitudinally adjustable to vary the depth to be cut by said supplemental cutter.

2. The combination with a borer or reamer having a marginal recess, of a supplemental cutter operating transversely of the reamer-cutter and independently thereof and adapted to be withdrawn into said recess when not required, and adjustable longitudinally of the reamer, substantially as specified.

3. A borer or reamer comprising a stock having a cutter operating longitudinally thereon, a shaft mounted for oscillation within said stock and carrying a supplemental cutter extending laterally therefrom, and means for adjusting said shaft and the cutter carried thereby longitudinally of the stock, substantially as specified.

4. A borer or reamer comprising a stock having a cutter operating longitudinally thereon and provided with a marginal recess, a shaft mounted for oscillation within said stock and carrying a laterally-extending supplemental cutter, and an operating-handle adjustably connected to said shaft, whereby said shaft and the cutter carried thereby may be adjusted longitudinally of the stock or the supplemental cutter withdrawn into said recess, substantially as specified.

5. A borer or reamer comprising a stock having a cutter operating longitudinally thereon and provided with a marginal recess, a shaft mounted for oscillation within said stock opposite said recess and provided with a transverse aperture, a supplemental cutter supported in said aperture and adapted to be withdrawn into or protruded through said recess, and means for adjusting said shaft and the cutter carried thereby longitudinally of said stock, substantially as specified.

In testimony that we claim the foregoing as our own we have hereto affixed our signatures in the presence of two witnesses.

FRANK PFLUGER.
EMIL CHRISTENSEN.

Witnesses:
J. H. La Moree,
C. L. Reed.